Patented Nov. 22, 1938

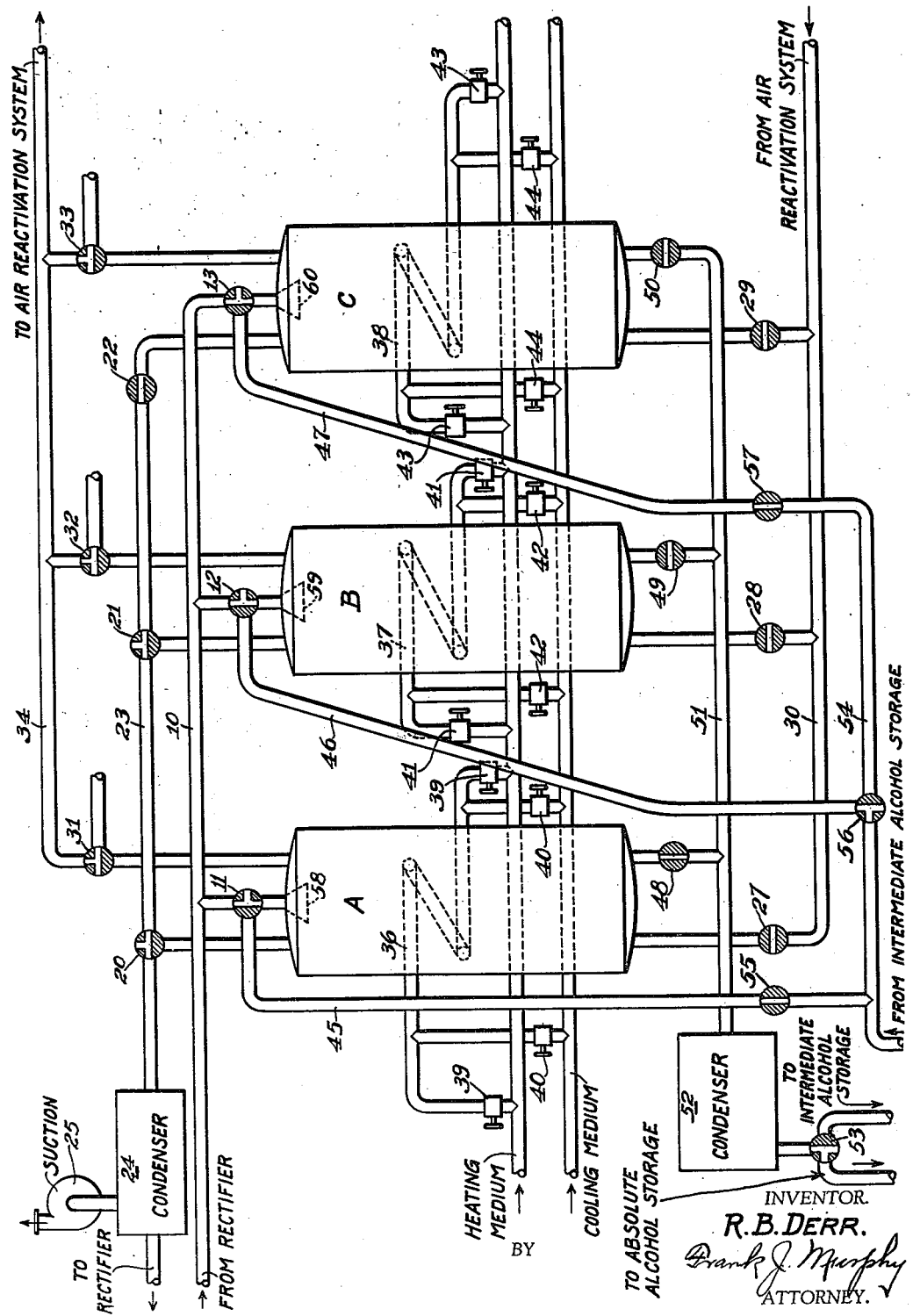

2,137,605

UNITED STATES PATENT OFFICE 2,137,605

METHOD OF DRYING ALCOHOL

Ralph B. Derr, Oakmont, Pa., assignor to Aluminum Company of America, Pittsburgh, Pa., a corporation of Pennsylvania Application March 24, 1937, Serial No. 132,874

4 Claims. (Cl. 183—4)

This invention relates to the drying of alcohol, and is particularly concerned with an improved method for the production of anhydrous and absolute ethyl alcohol.

There have been described methods for the production of anhydrous and absolute ethyl alcohol by contacting alcohol vapors containing water vapors with beds of various types of alumina adsorbents. The methods described have been found suitable for the production of alcohol of this grade. However, in commercial operation, particularly when relatively large beds of these alumina adsorbents are used, the control of temperatures within the beds has presented some difficulties. When alcohol vapors are brought into contact with a freshly reactivated bed of an alumina adsorbent, a certain amount of the vapor is adsorbed and the latent heat contained in the vapor is liberated. This heat of condensation is taken up by the adsorbent and produces a relatively large and rapid rise in temperature, at least locally, within the bed. Even under well controlled conditions this localized heating of the alumina adsorbent tends to reduce the efficiency of the process, since it reduces the adsorptive capacity at 100% efficiency of the adsorbent, and if the temperature rise is sufficiently great it may cause dehydration and polymerization of the alcohol molecule.

It is the primary object of this invention to provide an improvement in the processes heretofore devised for the production of anhydrous and absolute alcohols by contacting vapors of alcohol containing water vapors with beds of alumina adsorbents, by which the efficiency of these processes for the production of alcohols of the grades desired is substantially increased.

It is more particularly an object of this invention to provide a method for the drying of alcohol vapors by means of alumina adsorbents in which objectionable temperature rises in the adsorbent bed are substantially eliminated.

I have found that the relatively large and rapid temperature rise which ordinarily occurs when alcohol vapors are contacted with a freshly activated or reactivated bed of an alumina adsorbent can be substantially decreased or eliminated by moistening the alumina adsorbent with liquid alcohol prior to contacting the alcohol vapors containing water vapor with the adsorbent. Alumina adsorbents, in addition to their capacity for adsorbing water vapor, possess a capacity for adsorbing substantial amounts of alcohol. By first moistening the freshly activated or reactivated adsorbent with liquid alcohol I have found that the adsorptive capacity of the adsorbent for alcohol may be satisfied without the liberation of any great amount of heat, and the adsorptive capacity of the adsorbent for water vapor may be retained.

The term "alumina adsorbent" as used herein and in the appended claims includes any adsorbent material having an alumina base, such as actived alumina, the active adsorbing portion of which is composed of a partially dehydrated aluminum trihydrate obtained by calcining material containing aluminum hydrate in substantial amount at a temperature between 300° and 800° C., preferably at about 350° C., as well as such adsorbents when impregnated with hygroscopic salts.

The term "absolute alcohol" is used herein to designate alcohol which contains less than 1% of water and is intended to include pure alcohol and alcohol containing such small amounts of impurities as may be used as denaturents. By the term "anhydrous alcohol" is meant alcohol substantially completely free from water.

Alcohols other than ethyl alcohol may be dried and produced in a substantially anhydrous state by the use of alumina adsorbents in a similar manner, but the properties of the alumina adsorbents render them peculiarly suitable for application to the drying of ethyl alcohol, the drying of which is attended with considerably greater difficulty than the drying of other alcohols. As the process is particularly designed for use for the production of absolute or anhydrous ethyl alcohol, it will be described in detail in this connection. However, the invention is not to be considered as limited to use only in the treatment of ethyl alcohol.

In the accompanying drawing, in which is illustrated diagrammatically an apparatus which may be used in carrying out the method of my invention in the preferred manner, is shown a multiple bed drying apparatus, in the operation of which one bed of adsorbent is being used in drying alcohol vapors, a second bed of adsorbent is being reactivated after having been used to dry alcohol vapors, and a third bed of adsorbent is being cooled after reactivation and moistened with liquid alcohol preparatory to being used for drying further quantities of alcohol vapors.

Referring to the drawing, columns A, B and C containing the alumina adsorbent are connected by valves 11, 12 and 13, respectively, and pipe 10 with a rectifier (not shown), and by valves 48, 49 and 50, respectively, and pipe 51 with condenser 52, which in turn is connected by valve 53 with storage tanks (not shown) for dried and partially dried alcohol. Thus, by suitable adjustment of valves 11, 12 and 13, alcohol vapors from the rectifier may be passed into any one of the adsorbent beds A, B and C, where moisture contained in the vapors is adsorbed and the resultant anhydrous or intermediate alcohol may, by suitable adjustment of valves 48, 49 and 50, be passed to the condenser 52, and thence through valve 53 to either of the separate storage tanks for absolute alcohol and intermediate alcohol. The columns A, B and C are also connected, respectively, through valves 20, 21 and 22 and pipe 23, with a condenser 24 and vacuum pump 25, and by valves 27, 28 and 29 and pipe 30, and valves 31, 32 and 33 and pipe 34 in an air reactivation system which includes any suitable means (not shown) for supplying dry air heated to a suitable reactivating temperature, usually about 150° to 175° C., and for supplying cool dry air for cooling the reactivated adsorbent in the towers to the proper temperature for further use. Auxiliary heating and cooling means may be provided, preferably in the form of coils of pipe 36, 37 and 38, in the adsorbent columns, connected through valves 39, 40, 41, 42, 43 and 44 with hot and cold water pipes, by means of which the adsorbent beds may be brought to and maintained at a desired temperature. The tops of the columns A, B and C are also connected, respectively, by valves 11, 12 and 13, pipes 45, 46 and 47, valves 55, 56 and 57, and pipe 54 with the intermediate alcohol storage tank. The inlets to each of the columns A, B and C from valves 11, 12 and 13 are supplied, respectively, with shower heads 58, 59 and 60, or other suitable means for obtaining even distribution of liquid alcohol over the adsorbent bed.

The adsorbent columns are filled with an alumina adsorbent such as activated alumina scale. The alumina adsorbent is moistened, either before or after being placed in the adsorbent towers, with sufficient liquid alcohol to satisfy its adsorbent capacity for alcohol. The grade of alcohol used in this operation is not critical. It is preferable, however, to satisfy the adsorptive capacity of the adsorbent with a relatively dry alcohol, such as the intermediate alcohol, having a concentration between ordinary commercial 95% alcohol and absolute alcohol, which is produced in the ordinary operation of the process of my invention, as will be more fully set forth. By the use of a relative dry liquid alcohol for moistening the adsorbent, substantially all of the capacity for adsorption of water vapor is retained, and the efficiency of the adsorbent for use in drying alcohol vapors is preserved.

In practicing the process of the present invention in the preferred manner the alcohol vapors to be dried pass from the rectifier into the system through pipe 10 and are introduced into the top of the adsorbent tower A through valve 11. The vapors then pass downward through the adsorbent tower A where they are dried. The first portion of vapors coming through from the tower is completely anhydrous or contains less than 1% of water. These vapors are conducted through valve 48, condenser 52, and valve 53 to the absolute alcohol storage tank. As the adsorptive capacity of the adsorbent in tower A is used up the percentage of moisture in the alcohol vapors issuing from the tower increases. When the percentage of moisture has increased beyond the point desired for the production of absolute alcohol, the position of valve 53 is reversed and the partially dried alcohol vapors are passed through valve 48, condenser 52, and valve 53 to the intermediate alcohol storage tank. When the adsorptive capacity of the adsorbent in tower A becomes exhausted to the point desired for economical operation, valves 11 and 48 are closed and the vapors from the rectifier are passed through pipe 10 and valve 12 into the fresh adsorbent tower B. The absolute and intermediate grades of alcohol produced in tower B are passed through valve 49, pipe 51, condenser 52, and valve 53 to the absolute alcohol and intermediate alcohol storage tanks as before. Similarly, when the adsorptive capacity in the adsorbent tower B is exhausted to the desired point, the alcohol vapors from the rectifier are passed through pipe 10 and valve 13 into tower C, and the absolute alcohol and intermediate alcohol from tower C are collected separately by means of valve 50, pipe 51, condenser 52, and valve 53 in the respective storage tanks.

While the moist alcohol vapors are being passed through towers B and C, the adsorbent in tower A is prepared for the drying of additional alcohol vapors by reactivation, cooling, and moistening with liquid alcohol. A vacuum is first applied to tower A by means of pump 25 and condenser 24 through valve 20, while valves 27 and 31 are kept closed. Substantially all of the alcohol held by the adsorbent in column A can be thus removed, together with a part of the adsorbed water, and this mixture is returned to the rectifier through the condenser 24. By this means a substantial loss of alcohol vapors is prevented. After a major portion of the alcohol in the column is removed, valve 20 is closed and hot air is passed into the adsorbent column from pipe 30 through valve 27. The hot air removes moisture from the adsorbent and the moisture-laden air is allowed to escape to the atmosphere through valve 31, or passed to a condenser or other recovery apparatus (not shown). The reactivated adsorbent is then cooled to the desired temperature by recirculating cold, dry air through the bed by means of pipe 30, valve 27, valve 31, and pipe 34. Additional cooling may be obtained by circulating cold water through coil 36.

After the reactivated adsorbent has been cooled, liquid alcohol from the intermediate alcohol storage tank is introduced into the top of the adsorbent bed through valve 55, pipe 45, valve 11, and shower head 58. The liquid alcohol drains down through the adsorbent, and any excess over that required to moisten the adsorbent is conducted back to the intermediate alcohol storage tank through valve 48, condenser 52, and valve 53. After being moistened with liquid alcohol, the reactivated adsorbent in tower A is ready for further use in the drying of alcohol vapors. Similarly, when the adsorbent in tower B becomes exhausted, it may be reactivated and moistened with intermediate liquid alcohol while towers C and A are being used for drying alcohol vapors. Tower C may be reactivated and moistened with liquid alcohol while towers A and B are in use for drying alcohol vapors. Thus it will be apparent that by a cyclic operation of the apparatus illustrated a continuous production of absolute alcohol may be obtained.

The temperature of the adsorbent beds during the drying of the alcohol vapors may be carefully controlled within a range or ranges which will give optimum economical operation when the reactivated adsorbent is moistened with liquid alcohol according to my invention prior to contacting moist alcohol vapors containing water vapor with it. By this method I have found that a greater yield of absolute alcohol may be obtained when operating at a temperature of 80° to 87° C., and that by cooling the bed to a temperature of 78° to 80° C. during the period of production of intermediate alcohol an increased yield of this product is obtained. By suitable regulation of the flow of a heating medium or a cooling medium through the coils 36, 37 and 38 provided in the towers A, B and C, respectively, any necessary regulation of the temperature of the adsorbent bed may be readily attained.

The step of moistening the freshly reactivated adsorbent with liquid alcohol may also serve to effect a relatively large saving in the time required for preparing an exhausted bed of adsorbent for use in the drying of further quantities of alcohol vapors. It has heretofore been necessary, after reactivating the adsorbent, to cool the bed to a temperature substantially below the preferred operating temperature, so that the initial temperature rise which occurred when the alcohol vapors were contacted with the freshly reactivated adsorbent would not carry the temperature of the bed to a point where decomposition of the alcohol is obtained. On the other hand, according to the method of my invention it is necessary only to cool the freshly reactivated bed to the desired operating temperature, and moisten it with liquid alcohol. The excessive cooling heretofore required is thus eliminated. It is preferred, therefore, in carrying out the method of my invention, to moisten the freshly reactivated adsorbent with liquid alcohol heated to a temperature just below boiling.

It is, of course, to be understood that while I have described my invention in detail in connection with the operation of the multiple tower system illustrated, I do not intend that my invention be limited to, or circumscribed by, the particular details of operation described. For example, my invention may be practiced in a discontinuous manner with a single adsorption tower, or, if desired, it may be practiced with more than three adsorption towers, using two or more towers for adsorption or reactivation at the same time. The liquid alcohol used to moisten the reactivated adsorbent may, if desired, be introduced into the bed at various levels instead of at the top only. Also, the direction of flow of the liquid alcohol used to moisten the reactivated adsorbent, or the direction of flow of the alcohol vapors to be dried, may be reversed if desired, so that either or both may be introduced into the adsorbent tower at the bottom and withdrawn at the top. Other changes in details of operation may also be made as desired by the particular application to which the method of my invention is applied.

I claim:

1. A method of producing anhydrous and absolute alcohols comprising passing alcohol vapors containing water vapor through a bed of freshly reactivated alumina adsorbent moistened with sufficient liquid alcohol before contact with alcohol vapors, to satisfy its adsorptive capacity for alcohol.

2. In a method of producing anhydrous and absolute alcohols by passing alcohol vapors containing water vapor through a bed of an alumina adsorbent, the step comprising moistening said alumina adsorbent with liquid alcohol subsequent to activating said adsorbent and prior to contacting with said adsorbent the alcohol vapors containing water vapor.

3. In a method of producing anhydrous and absolute ethyl alcohols by passing alcohol vapors containing water vapor through a bed of an alumina adsorbent, the step comprising moistening said alumina adsorbent with liquid alcohol subsequent to activating said adsorbent and prior to contacting with said adsorbent the alcohol vapors containing water vapor.

4. A method of producing anhydrous and absolute alcohols comprising passing alcohol vapors containing water vapor through a bed of activated alumina which has been activated by calcining at a temperature between 300° and 800° C. and saturated with alcohol by moistening with liquid alcohol prior to contact with alcohol vapors.

RALPH B. DERR.